UNITED STATES PATENT OFFICE.

O. MACDANIEL, OF NEW YORK, N. Y.

IMPROVED PROCESS FOR CLEANING WOOL AND OTHER FIBERS.

Specification forming part of Letters Patent No. 71,191, dated November 19, 1867; Reissue No. 3,229, dated December 22, 1868.

DIVISION A.

*To all whom it may concern:*

Be it known that I, OSBORNE MACDANIEL, of New York, in the county and State of New York, have invented a new and Improved Process for Cleansing Wool and other Fibrous Substances; and I do hereby declare that the following is a full, clear, and exact description thereof, which will enable others skilled in the art to understand and use the same, reference being had to the accompanying drawings, forming part of this specification.

This invention relates to an improvement in the process of cleaning wool and other fibrous substances, which in their natural and raw state contain oily matters and impurities; and my improvement consists in the employment and use of the hydrocarbons or volatile oils known as "petroleum-benzole or petroleum-naphtha" for washing the said fibrous substances and extracting the fixed oils and impure oily matters therefrom by means of the solvent power of these volatile oils, or either of them. For this and similar purposes bisulphide of carbon, ether, chloroform, coal-tar benzole, and coal-tar naphtha, and other chemical solvents of the fixed oils have been previously employed, as I am aware; but practical objections, on account of their high cost and limited supply, have prevented the general adoption and use of these chemical agents.

The practical objections to the use of coal-tar benzole and naphtha and other chemical agents upon the large scale of operations required for the purpose of this invention do not apply to petroleum benzole and naphtha, which are incidental products of the petroleum-oil distilleries, so extensively in operation since the comparatively recent discovery and working of petroleum or earth oil wells in this country. These volatile products of petroleum-oil are abundant and cheap, and prior to my invention have not been employed for the purpose thereof. Chemically they are distinguished from coal-tar benzole and naphtha by the formulas, petroleum-benzole=$C^{12}H^{14}$, coal-tar benzole=$C^{12}H^{6}$, and are therefore distinct substances, chemically as well as commercially.

The mechanical appliances by which wool and other fibrous substances—such as hair, feathers, and silk—in their natural or raw state are to be cleaned by the application and use of petroleum benzole and naphtha, consist of a washing-machine connected with a still and condensing apparatus. The wool or other fibrous substance to be cleaned is put into the washing-machine, which is a tub or vessel so constructed as to be capable of being closed hermetically and made steam-tight when in operation. The benzole or naphtha is then introduced into the closed vessel in sufficient quantity to dissolve and extract the oily matters and impurities contained in the wool or other fibrous substance, which is to be subjected to agitation and movement with suitable apparatus in the washing-machine to cleanse it thoroughly. Steam or other heat may be applied during the operation. The solution of benzole or naphtha, and the oily matters and impurities extracted from the fibrous substance, is then drawn off through a pipe and conveyed to a still, where the volatile oil is separated from all its impurities by distillation in the usual way, to be recovered pure and used over again. The oily matters and impurities are also thus separated and saved to be utilized. After the impure solution has been drawn off from the washing-machine into the still, that portion of the volatile oil adhering to the fibrous substance is evaporated by steam, hot water, or air, and driven through an ordinary goose-neck connecting the washing-machine with the condensing-coil of the still, whereby waste and loss of material are prevented. In some cases the fibrous substance thus treated with petroleum benzole or naphtha will be sufficiently cleansed and purified without further operation, and may be taken out of the washing-machine and dried, or may be dried therein by the application of steam or other heat, if desired; but in other cases it may be necessary also to subject the fibrous substance to a hot alkaline wash in order to cleanse it completely of all adhering impurities.

The apparatus used for this purpose may be varied in construction in its details; but the following is a description of that which I employ.

A represents a scouring or washing tub or vessel, which is provided with a shaft, B, armed with suitable beaters or paddles *a a* for washing the fibrous materials to be cleaned. At the bottom of the tub A is an opening, *b*, to allow the discharge of the impure solution, after washing the fibrous materials, through a conducting-pipe into the still C. The tub A is supplied with the solvent from a tank placed above it, or directly from a reservoir, D, placed below the level of the still. The tub A is also provided with a steam-tight cover, as shown in the tub E, which represents a modification of the washing-machine, and it is connected directly with the condensing-coil F by a goose-neck, H, for carrying over the vapor of the volatile oil from the washing-tub when in operation, thus insuring safety and saving loss and waste by evaporation.

The fibrous materials are put into the washing-machine, which is closed steam-tight and then supplied with the benzole or naphtha. When the operation is completed, by subjecting the fibrous materials to suitable agitation in the washing-machine the solution is run off into the still, where the volatile oil is separated from the oily matters and impurities it may contain by the ordinary process of distillation with steam or other heat at a low temperature. After passing through the condensing-coil F, it is conveyed in a pure state to the reservoir D, to be used over again, from which it is elevated as needed by a force-pump, *c*.

Hot water or air or steam is introduced into the washing-machine after the solution has been discharged therefrom into the still, and the portion of the volatile oil adhering to the fibrous materials is evaporated and driven off through the goose-neck H, to be condensed in the coil F and conveyed, as before, to the reservoir D. Thus waste and loss of material is entirely prevented, and the whole operation is performed in a close steam-tight apparatus with facility, safety, and economy.

I disclaim the use of bisulphide of carbon, ether, chloroform, coal-tar benzole, or coal-tar naphtha, and other chemical agents for the purpose aforesaid; but, Having described the nature and character of my improvement, what I claim, and desire to secure by Letters Patent, is—

1. The employment and use of petroleum benzole and naphtha, or either of them, for the purpose of cleaning wool or other fibrous substance, substantially as herein described.

2. The combination of a steam-tight washing-machine, A, with a still, C, and a condensing-coil, F, constructed, arranged, and operating substantially as and for the purposes herein described.

O. MACDANIEL.

Witnesses:
EDM. F. BROWN,
CHAUNCEY BESTOR.